United States Patent [19]

Bidwell

[11] Patent Number: 4,522,541
[45] Date of Patent: Jun. 11, 1985

[54] STUD FASTENER RECEPTACLE

[75] Inventor: Richard H. Bidwell, Farnham, England

[73] Assignee: Dzus Fastener Co., Inc., West Islip, N.Y.

[21] Appl. No.: 492,148

[22] Filed: May 5, 1983

[30] Foreign Application Priority Data

May 10, 1982 [GB] United Kingdom ............... 8213497

[51] Int. Cl.³ .............................................. A44B 17/00
[52] U.S. Cl. ................................... 411/554; 411/552; 411/555; 24/597; 24/590
[58] Field of Search ............... 24/590, 591, 592, 593, 24/594, 595, 596, 597, 663; 411/554, 555, 552, 549

[56] References Cited

U.S. PATENT DOCUMENTS

| 3,487,512 | 1/1970 | Marosy | 24/597 |
| 3,564,563 | 2/1971 | Trotter et al. | 411/552 |
| 3,675,280 | 7/1972 | Winslade | 411/552 |
| 3,975,804 | 8/1976 | Schenk | 411/555 |
| 4,128,923 | 12/1978 | Bisbing | 411/552 |
| 4,308,646 | 1/1982 | Schenk | 411/554 |

Primary Examiner—Victor N. Sakran
Attorney, Agent, or Firm—Kane, Dalsimer, Kane, Sullivan & Kurucz

[57] ABSTRACT

A receptacle (20) for a stud (30) is mounted in a rectangular aperture (38) in a member (34). The receptacle has a housing (22) with a base (40) and flat legs (42, 44) and is held on the member (34) by being gripped between flanges (46, 48) on the legs and a non-circular element (28). Each of the legs has a side flange (54) on each side and diametrically opposite one of the said flanges have a slot (55). The pair of opposed flanges on each side of the receptacle define an elongate slot between them in which the non-circular element is free to move after rotation from a position in which it is held within the transverse slot (55).

5 Claims, 6 Drawing Figures

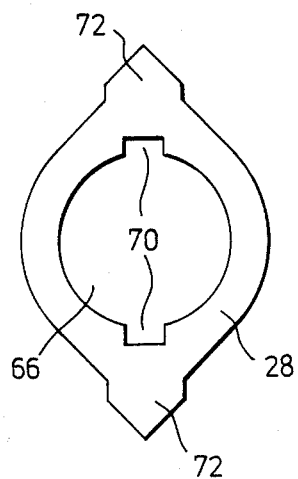
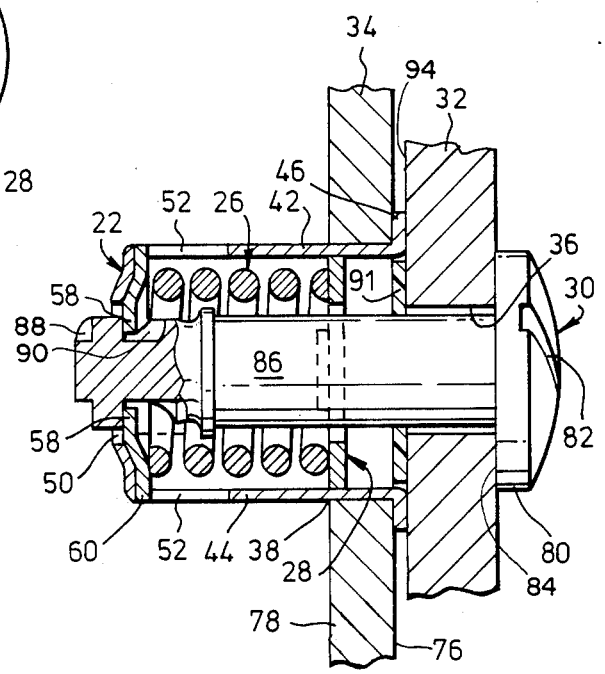
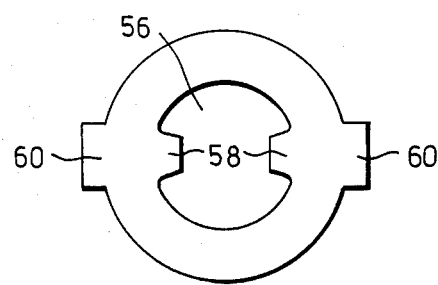

STUD FASTENER RECEPTACLE

The invention relates to receptacles for fasteners of the kind having a stud which is received and secured in the receptacle to fasten together a pair of members. More particularly the invention relates to such receptacles which can be inserted into an aperture in a member from the front.

Various types of front insert receptacles have been developed in recent years for avoiding the problems resulting from difficulty of access to the rear side of a panel or similar structure on which the receptacle is to be mounted. Several examples are depicted in the U.S. Pat. No. 3,975,804. In general the front insert receptacles shown in that patent specification deal with various types of tubular housings with keyways and wound springs for facilitating mounting of the various forms. All of the structures show an element in the housing which is shiftable between an operative and an inoperative position so that when the receptacle is positioned in an opening in a member, movement of the element into the operative position locks the receptacle in position on the member. Other parts of the various receptacle designs contain engagement structure for coupling with a stud interengaged with a second member so that the two members can be fastened together by the stud and receptacle. Our European patent application No. A 0 018 809 shows a further example of the same type of receptacle.

According to the invention a receptacle for receiving and securing a stud to enable a pair of members to be fastened together and being mounted in use in a rectangular aperture in one of the members, and comprising a housing for location in the aperture, the housing being substantially U-shaped and comprising a base and a pair of depending opposed substantially flat legs, each leg having an outwardly extending flange at its free end for engaging the front face of the member, the sides of the legs preventing rotation of the receptacle in the aperture, and a non-circular element, rotatable in the housing between a first position in which it is withdrawn from engagement with the rear face of the member and a second position in which it is engaged with the rear face of the member; and means for securing the stud within the receptacle is characterised in that each leg has inturned flanges along its sides partially closing the sides of the receptacle between the legs, diametrically opposite one of the flanges having a slot transverse to the axis of the receptacle which is substantially parallel to the legs, and the pair of opposed flanges on each side of the receptacle defining therebetween an elongate slot extending between the end of the flanges at the free end of the legs and the respective transverse slot; the element being rotatable in the housing between a first position in which it is held in the transverse slots and a second position in which it is located in the elongate slots and biased in use against the rear face of the member by means of a spring to lock the receptacle on the member.

A front insert receptacle of this type can be mounted in a member such as a panel by insertion into the opening from one side thereof and locked in position by appropriate manipulation of the element from the same exposed side of the member. By closing the sides of the receptacle the non-circular element can be prevented from slipping sideways out of the side of the receptacle during the insertion of the receptacle on the member to which it is fastened.

A minimum number of parts of inexpensive construction are provided leading to an overall low cost product. The receptacle is designed to be quickly and efficiently inserted which further enhances the minimum cost feature of the receptacle particularly when the receptacle is mass produced and used in large numbers in single and multiple installations.

Preferably, the receptacle is designed for use with a stud of the type employing a helical cam slot designed for quarter turn action in locking and unlocking the stud with respect to the receptacle. This type of arrangement is commonly used, for example, in fastening panel to panel arrangements or mounting a member on a wall surface where access to the rear side of the receiving surface is difficult or impossible. The entire assembly operation for the fastener, which includes insertion and mounting of the receptacle in position from the exposed side of the receiving panel and the ultimate fastening and unfastening of the stud with respect to the receptacle can be carried out from the same exposed side of the panel.

One example of a fastener which has a receptacle according to the present invention will now be described with reference to the accompanying drawings in which:

FIG. 4 is a sectional view of the fastener assembly showing the stud and receptacle in fastened condition;

FIG. 5 is a plan view of the top plate; and,

FIG. 6 is a plan view of the tab plate.

Figure 1:
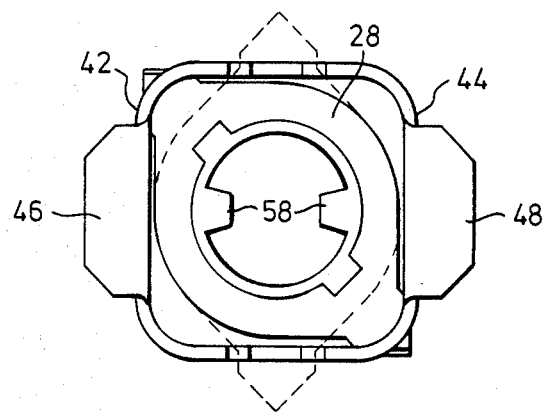
FIG. 1 is a top plan view of a receptacle according to the invention.
Figure 2:
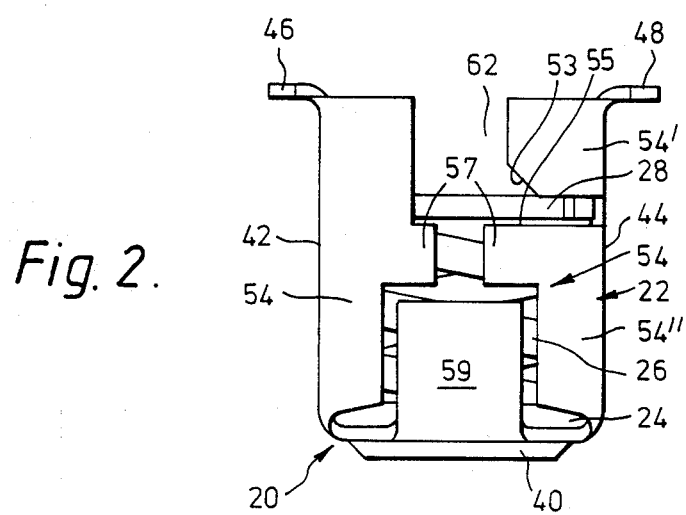
FIG. 2 is a first side view thereof.

The Figures show a receptacle 20 designed so that it can be manufactured from a conventional inexpensive metal or plastics material, and is designed for use, for example, in panel-to-panel arrangements or for mounting fixtures of other structures to a wall surface with a receiving panel or surface of the type where access to the rear side thereof is difficult or impossible. The receptacle is mounted from the exposed front surface of the receiving panel 34.

In the example shown the receptacle 20 includes a U-shaped housing 22, a base or tab plate 24, a helical compression spring 26, and a top plate 28. The receptacle 20 is designed for coupling and uncoupling with a stud 30 to form a fastener assembly.

The fastener assembly, in assembled condition, is depicted in FIG. 4 as holding together two panels 32 and 34.

As shown, panel 32 has an aperture 36 therethrough and panel 34 has a substantially square aperture 38 therethrough. These apertures are designed to be aligned so that when the stud 30 is coupled with the panel 32 and the receptacle 20 is coupled with the panel 34, the stud and receptacle can be interconnected to hold the panels 32 and 34 together.

The U-shaped housing 22, which can be formed simply from a metal blank, includes a base 40, and a pair of opposing generally flat legs 42 and 44, upstanding from the base 40, each of which terminates at its free end in a respective outwardly extending flange 46 or 48. The base 40 is slightly dished and has a central aperture 50 therein and each leg has a rectangularly shaped slot 52 extending upwardly from the base toward the open end of the housing, but terminating well short of the open end. On each side of each leg is an inwardly extending flange 54. Diametrically opposite ones of the flanges are divided into parts 54' and 54" by a transverse slot 55, and opposed ones of the flanges define an elongate slot 62 connecting with a respective transverse slot 55, the corner between them being chamfered at 53 to prevent snagging. It has been found convenient to form flanges 54 by cutting and bending portions of the legs 42 and 44 so that the flanges are integrally formed with the housing. Each of the flanges 54 has an extension 57 as will be explained later.

The tab plate 24 is also slightly dished and is substantially circular in configuration with a central aperture 56 therein. A pair of tabs 58 extend inwardly into the aperture and are diametrically opposed. Aligned with the tabs 58 and extending outwardly from the plate 24 are a second pair of opposed tabs 60 which are designed to fit and slide vertically in the slots 52 of the housing, the plate 24 being adapted to be inserted into the housing with the aperture 56 aligned with the aperture 50 of the housing. Thus, the tab plate 24 is permitted limited vertical reciprocation while being prevented from rotational movement by the positioning of the tabs 60 in the slots 52.

The helical spring 26 is a conventional helical compression spring and is large enough to seat on the tab plate 24, the spring being urged into a centralized position by the dishing of the plate 24, the flanges 54 and upstanding base flanges 59 which are formed from parts of the housing which connect the housing blanks before they are bent-up into their finished form. The upper end of the spring 26 seats against the undersurface of the top plate 28. The top plate 28 has a diameter such as to permit its rotation within the housing 22, and is formed with a central aperture 66 for alignment with the apertures 56 and 50 of the tab plate and housing respectively and also with the passageway 68 through the helical spring 26. A pair of keyway notches 70 are diametrically opposed about aperture 66. Aligned with the keyways 70 are a pair of opposing generally triangularly shaped protrusions 72. The top plate thus has overall a lozenge shape.

The dimensions of the housing 22, the tab plate 24, the spring 26, and the top plate 28 at such that when they are positioned in the housing the spring 26 is partially compressed and the top plate is shiftable or rotatable to a position (as shown) where the protrusions 72 are retained or captured against the undersurface of the opposed flanges, in the slots 55, the dimensions of the top plate 24 being such that the protrusions lie within the square envelope of the sides of the housing to avoid snagging on the sides of the panel aperture during installation. In this condition, the receptacle 20 is prepared for mounting in panel 34. The receptacle is mounted through the opening 38 from the front side 76 of the panel 34. There is no need for access to the rear side 78 of the panel. The receptacle is inserted through the opening 38 until the undersurfaces of the flanges 46, 48 engage the side 76 of the aperture in the panel 34. The receptacle is designed in a range of sizes to suit different opening sizes so that the flanges 46 and 48 extend beyond the edges of the opening. The outer faces of the flanges 54,54' act to prevent any rotation of the receptacle in the opening, by engagement with the sides of the opening.

After initial locating of the receptacle in the opening 38 an appropriate tool such as the tip of a screwdriver can be engaged with the keyway notches 70 of the top plate 28 and the plate rotated (to the position shown in dotted lines in FIG. 1) to displace protrusions 72 from engagement within the slots 55 with the undersurface of flanges 54'. This rotation will bring the protrusions 72 into a position where they are free to move under the action of the spring along the slots 62. Over rotation of the top plate 28 is prevented by the opposed flanges 4 being undivided at the level of the slots 55. The spring 26 which is partially compressed will then bias the top plate 28 upward until the protrusions 72 engage with the undersurface 78 of the panel 34 thereby locking the receptacle in position. The position of the tabs in the locked position is clearly depicted in FIG. 4. In this arrangement, the panel is held between the undersurface of the lateral flanges 46 and 48 and the upper surface of the protrusions 72. The receptacle is then ready to receive the stud 30.

Figure 3:
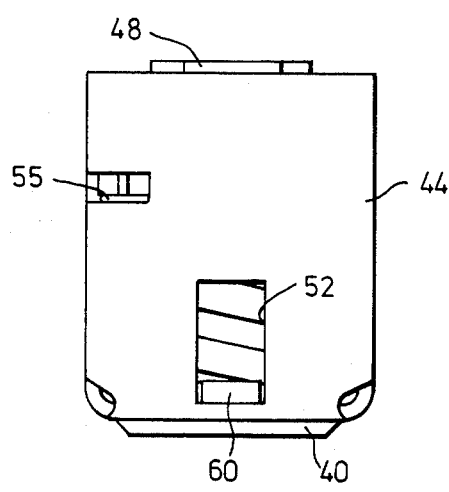
FIG. 3 is a second side view at 90° to the first.

As shown, the stud is conventional and includes an enlarged head 80 with a slot 82 in its upper surface for engagement by a tool, such as a screwdriver tip, for rotational purposes. Extending from the undersurface 84 of the head 80 is a reduced diameter shank 86. Adjacent the end of the shank 86 distal from the head is a helical cam slot 88. It has been found effective to make the length of the cam slot sufficient to require a quarter turn to move the stud in the receptacle between the open and closed positions. The cam slot generally terminates in a locking detent 90 at the upper end of its helical path. As a matter of choice, a washer 91 can be employed to facilitate retention of the stud on the panel 32 prior to assembling the fastener and fastening of the panels together. As shown in FIG. 3, the stud is mounted on the panel 32 by extending the shank 86 through the aperture 36. The head 80 is larger than the aperture so that the undersurface 84 of the head engages with the upper surface 92 of the panel. The washer 91 can then be inserted on the shank end and shifted upward into the proximity of the undersurface 94 of the panel 32.

The stud is inserted into the receptacle 20 as panel 32 is brought into alignment with and against the panel 34. The stud shank 86 passes through the aperture 66 in the top plate 28, through the central opening 68 in the compressed helical spring 26, and into the aperture 56 in the tab plate 24, passage through the aperture 56 being aided by the dished form of the tab plate 24 which directs the tip of the shank towards the centre. At that time, the tab 58 will engage with the entrance to the helical cam slot 88 and rotation of the stud by use of the tool in the slot 82 will cause the tab plate 24 to ride axially upward as tabs 58 follow the cam slots 88 into the locking detents. In this embodiment, a quarter turn rotation is sufficient to accomplish this result. Axial movement of the plate 24 is permitted by the axial freedom of movement of the projections 60 in the slots 52, the slots 52 preventing rotation of the plate as the stud rotates so that the fastening action can be accomplished. As the plate 24 moves upward it further compresses the spring 26 which is captured between the plate and the dished or flat undersurface of the top plate 28. Thus, spring tension is provided by the biased helical spring 26 to assist in retaining the stud and receptacle in fastened condition with the tabs 58 in the locking detents at the ends of the cam slots 88.

Unfastening is accomplished simply by rotating the stud 30 in the opposite direction thereby permitting plate 24 to travel downward and free tabs 58 from cam slot 88. The stud and panel 32 can then be disassembled from the receptacle and panel 34.

If desired, the receptacle 20 can be disassembled from panel 34 by using the appropriate tool to engage the keyway notches 70 and to depress the top plate 28 downward, thereby compressing the helical spring 26, until rotation of the top plate 28 brings it into engagement with the extended portions 57 of the flanges 54. The top plate can then be rotated until the protrusions 72 lie in the slots 55 and the receptacle will then be free for removal through the aperture 38.

I claim:

1. A receptacle for receiving and securing a stud to enable a pair of members to be fastened together, said receptacle being mounted in use in a rectangular aperture in one of said members, and said receptacle comprising a housing for location in said aperture, said housing being substantially U-shaped and comprising a base at one end and a pair of depending opposed substantially flat legs defining an axial direction of said receptacle, each of the legs having an outwardly extending flange at its end remote from the base for engaging the front face of said one member, the sides of said legs preventing rotation of said receptacle in said aperture, and a non-circular element rotatable in said housing between a first position in which it is withdrawn from engagement with the rear face of said one member and a second position in which it is engaged with said rear face of said one member; and means for securing said stud within said receptacle, wherein each of said legs has an inturned flange disposed along each side, said flanges partially closing the sides of said receptacle between said legs, one diametrically opposite pair of said flanges defining a slot transverse to the axis of said receptacle and the pair of opposed ones of said flanges on each side of said receptacle defining therebetween an elongate slot extending between the end of the flanges remote from the base and the respective transverse slot, said non-circular element being rotatable in said housing between a first position in which it is held in said transverse slot and a second position in which it is located in said elongate slots and biased in use against the rear face of said member by said spring to lock said receptacle on said member.

2. A receptacle according to claim 1, further comprising a pair of second flanges, one extending from each side of said base of said receptacle and lying between said legs, each of said second flanges being substantially coplanar with said flanges on said sides of said legs.

3. A receptacle according to claim 1, wherein an extension is provided on each of said flanges on said legs, said extensions on opposed flanges likewise opposing one another, and said respective extensions on said respective flanges defining said transverse slots being positioned adjacent said respective slot thereby to form a stop to define an entrance position for rotation of said non-circular element into said slot on movement from said second to said first positions.

4. A receptacle according to claim 1, wherein each of said transverse slots has an entrance, said entrance being chamfered on the side of said slot remote from said base.

5. A receptacle according to claim 1, wherein said housing is integrally formed from a single piece.

* * * * *